United States Patent Office 2,959,232
Patented Nov. 8, 1960

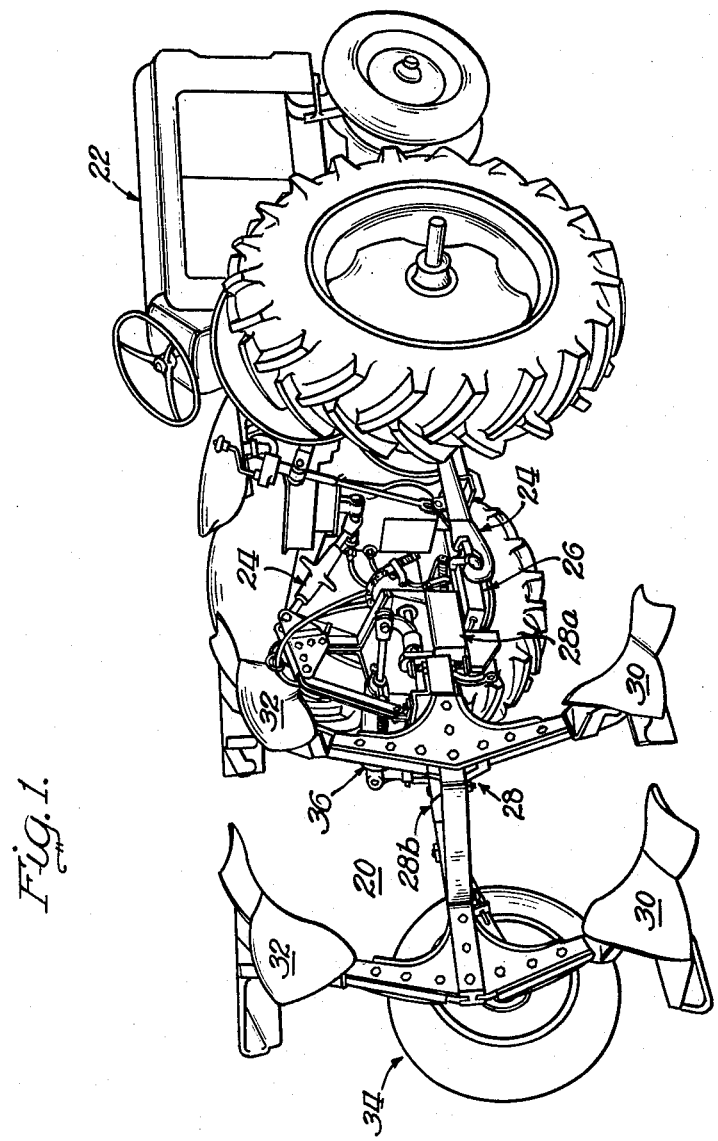

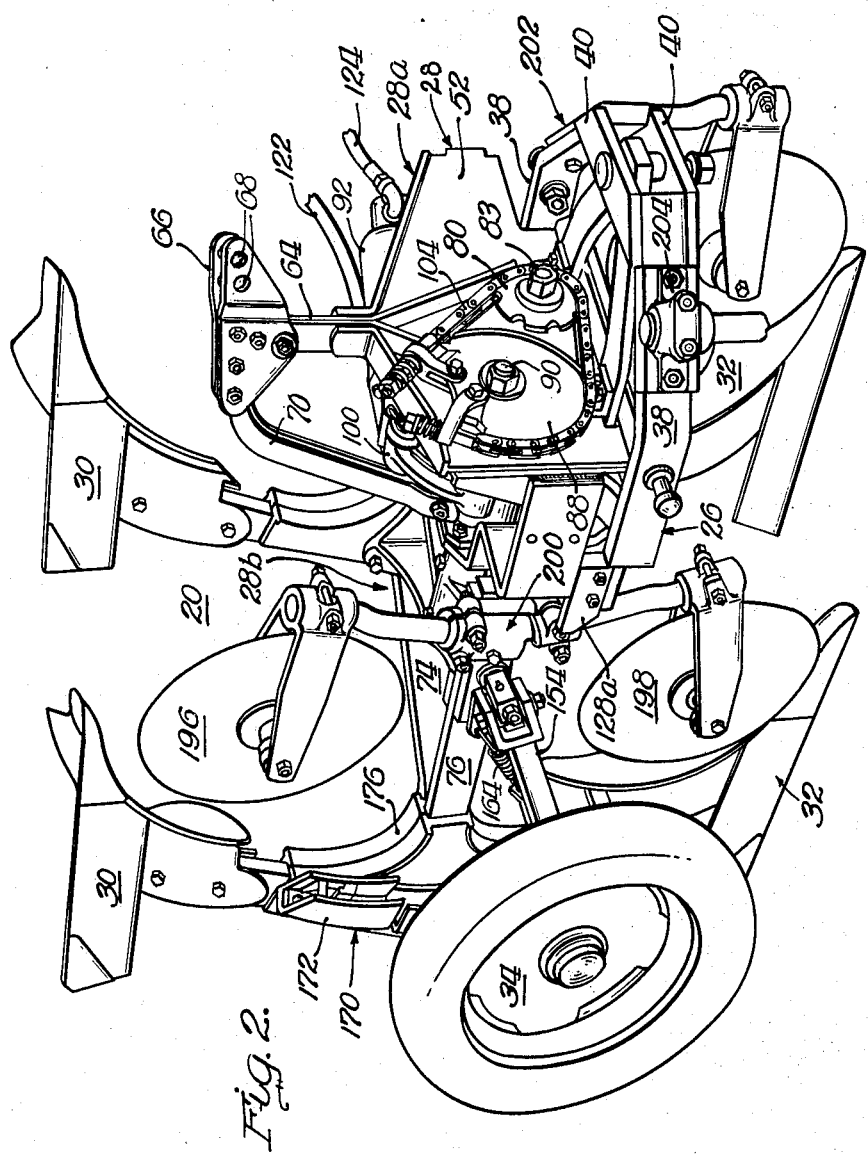

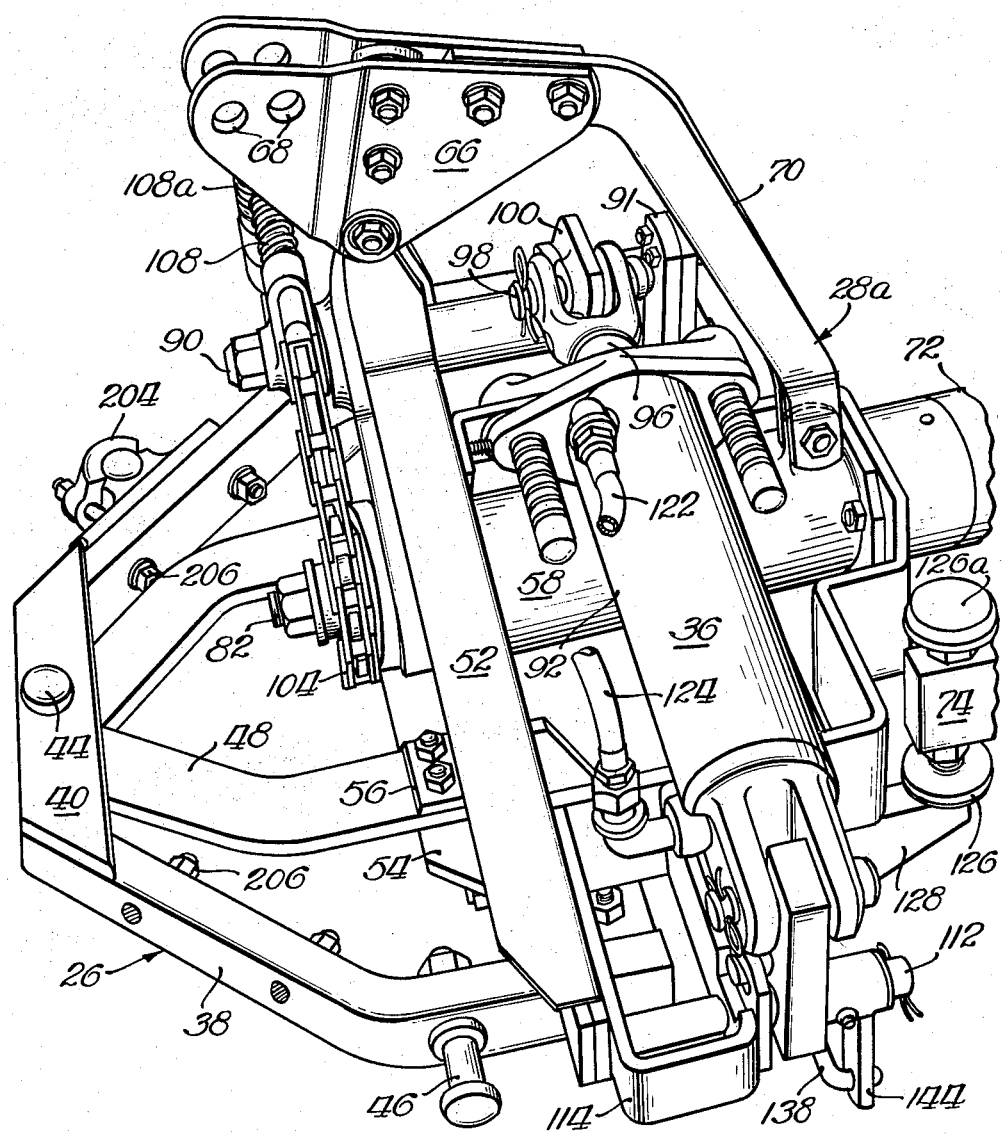

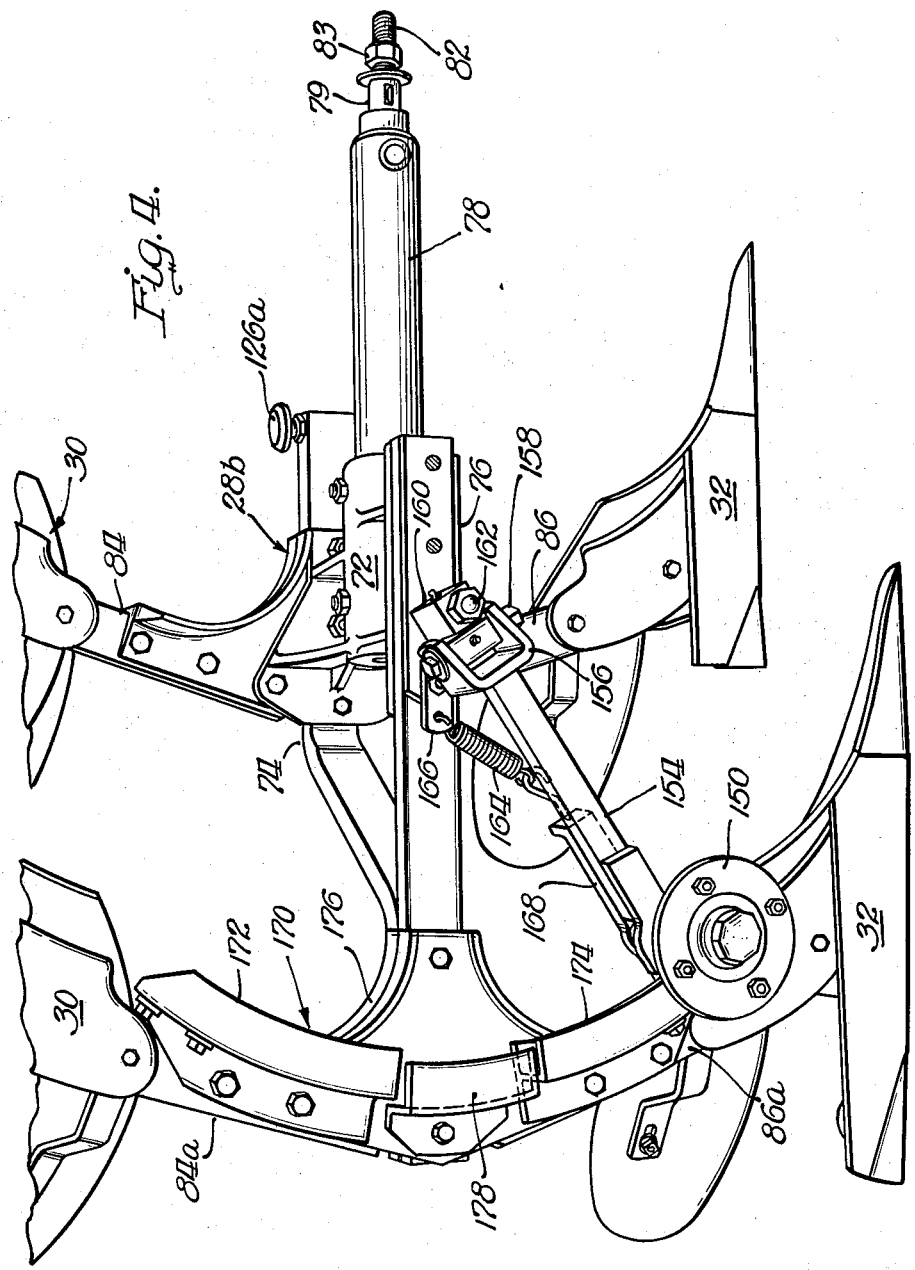

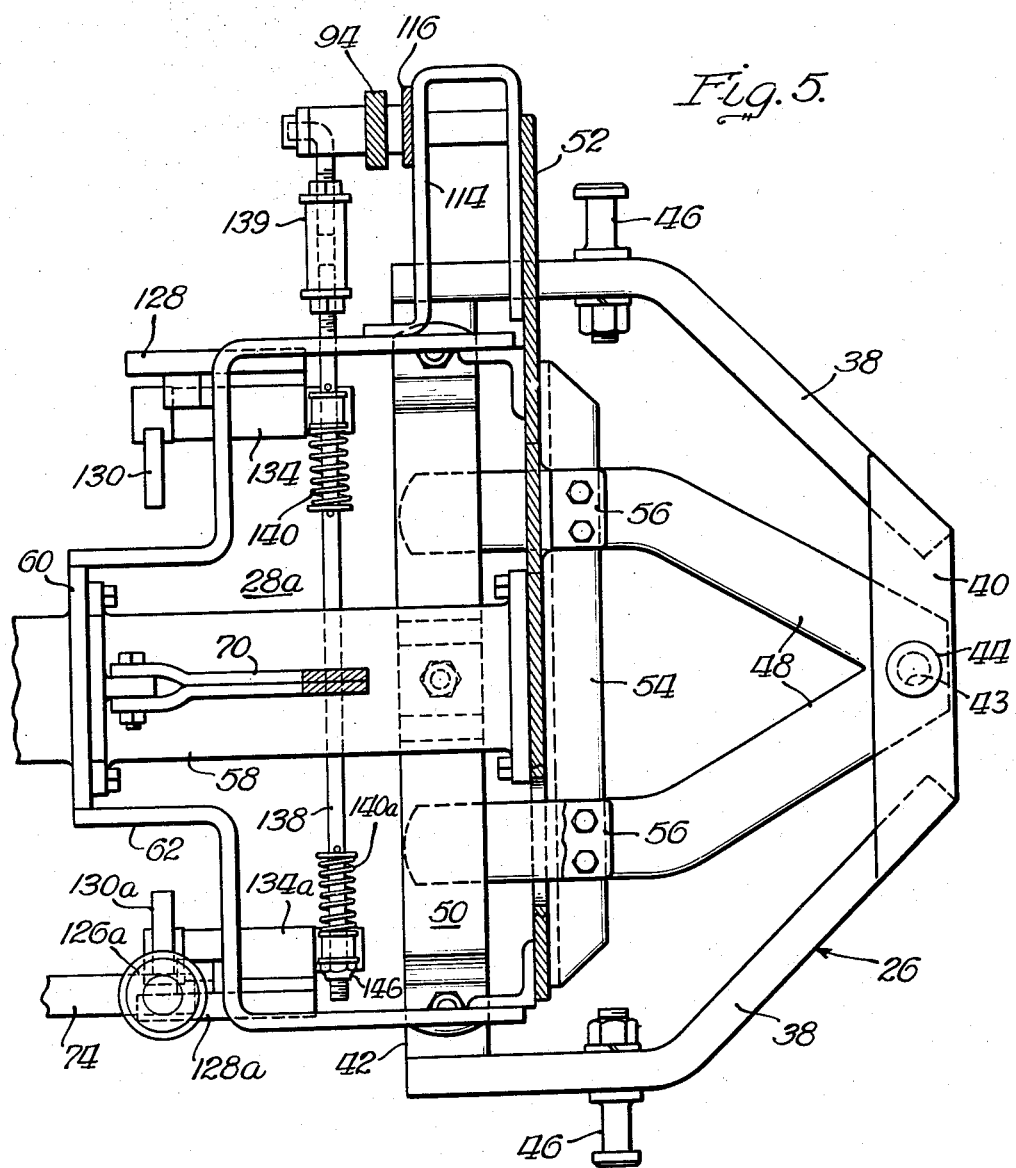

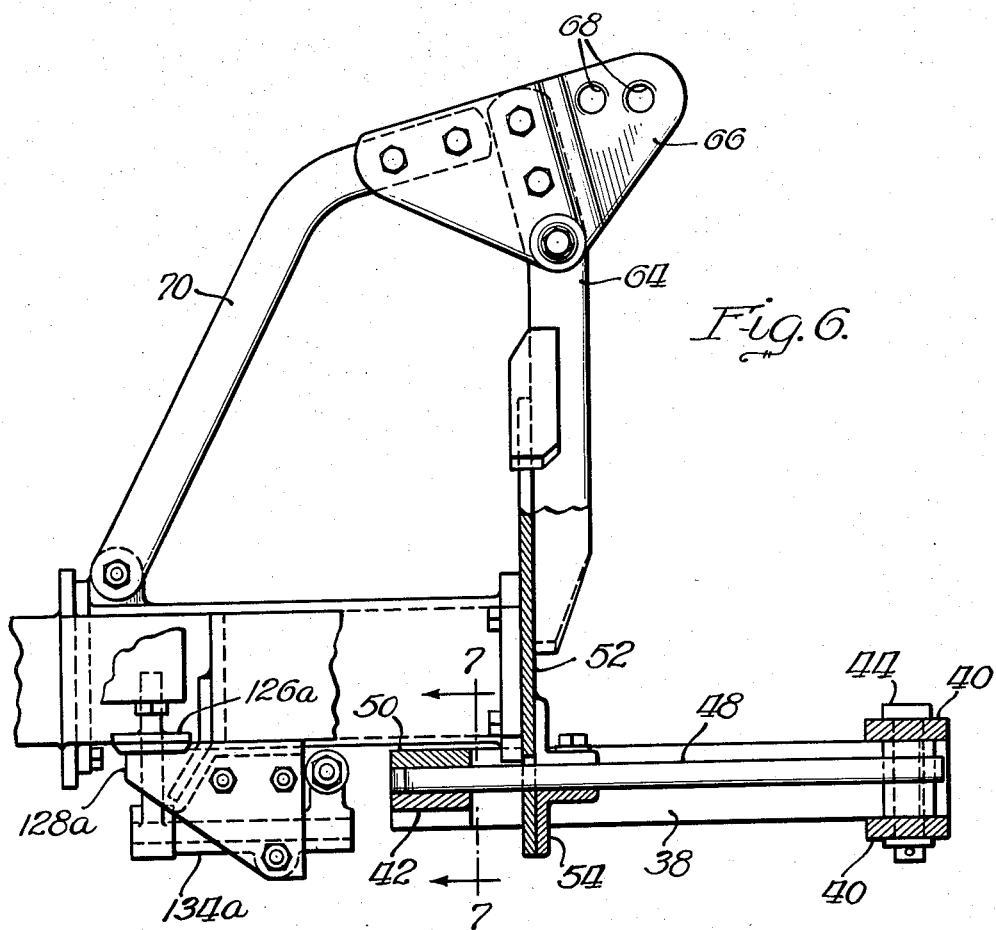
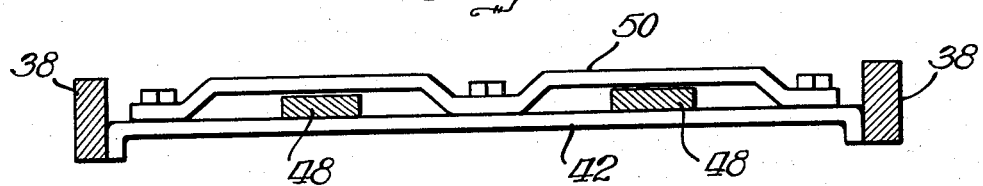

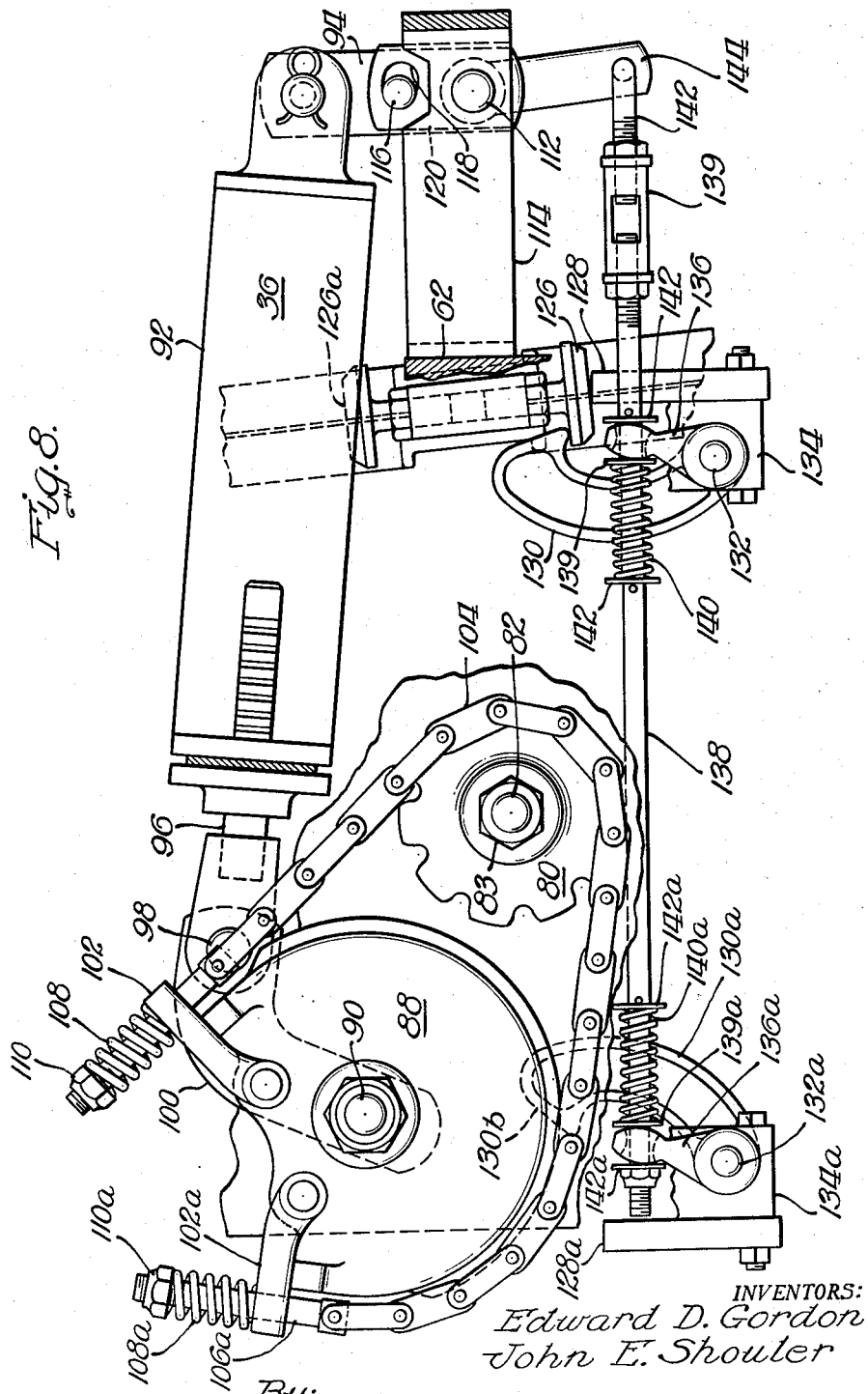

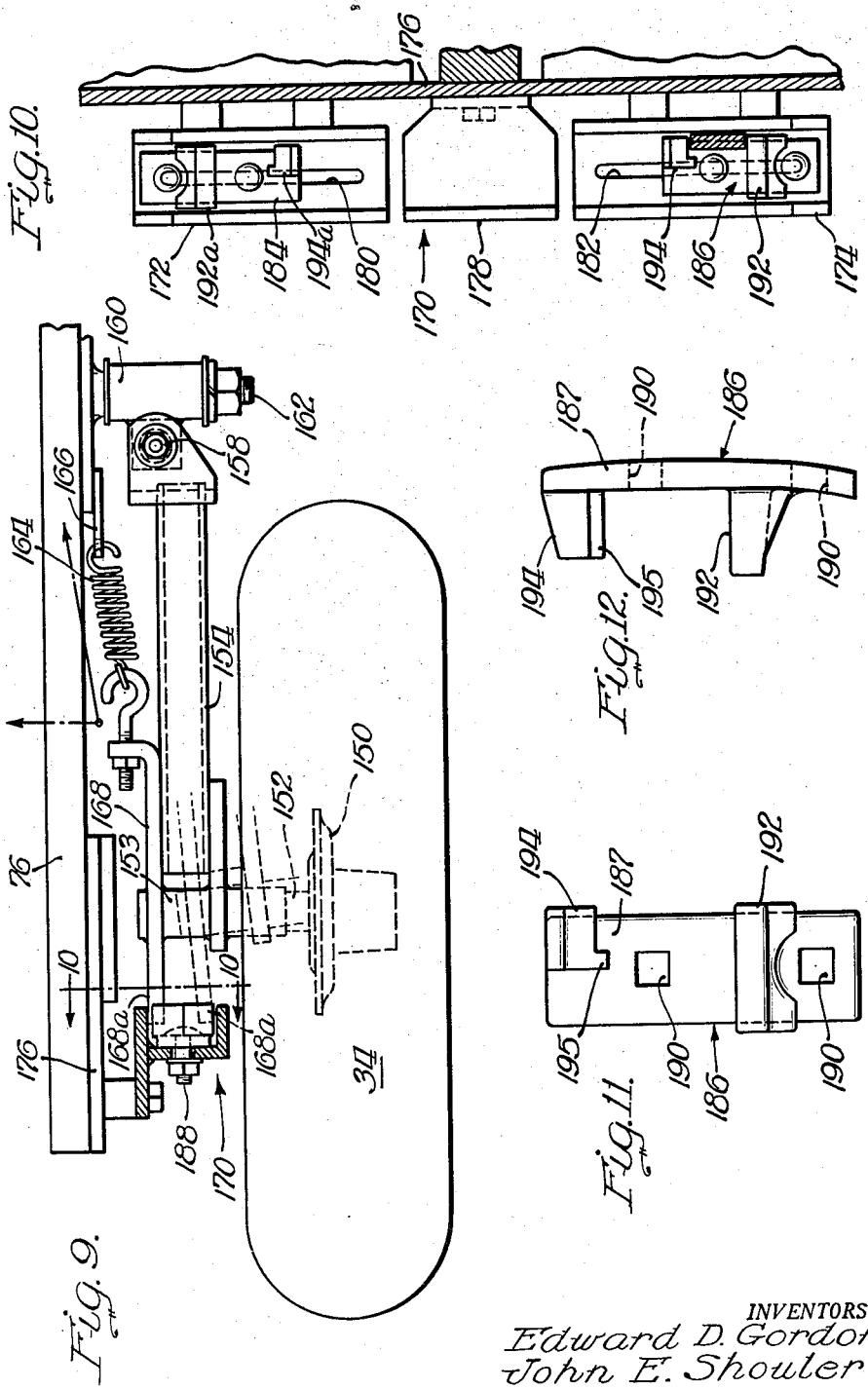

2,959,232

TRACTOR MOUNTED TWO-WAY PLOW WITH SINGLE GAUGE WHEEL AND IMPROVED DRAFT MEANS

Edward D. Gordon and John E. Shouler, Rockford, Ill., assignors to J. I. Case Company, a corporation of Wisconsin Filed Aug. 13, 1956, Ser. No. 603,623

6 Claims. (Cl. 172—212)

The present invention relates generally to agricultural implements and is particularly directed to an improved form of two-way plow with a single gauge wheel and improved draft means.

The use of a two-way plow, that is, one which has at least one pair of oppositely disposed plow bottoms arranged to selectively turn a furrow either to the left or to the right, has been found to be very effective in avoiding "dead" furrows, in most efficiently performing the necessary plowing operations for contour farming, and in plowing on slopes so that all of the furrows can be turned uphill to thereby provide ridges for catching and holding water long enough to permit it to soak into the ground. This invention is particularly concerned with an improved form of the "turn-over" type of two-way plow, wherein the right and left-hand plow bottoms are arranged in diametrically opposed relation to each other for rotation about a longitudinally extending axis.

It is a primary object of the invention to provide an improved form of two-way plow, which includes a novel draft arrangement and means for releasably maintaining the selected plow bottom in position relative to the draft frame. Another object of the invention is to provide a novel form of two-way plow of the turnover type, wherein the unused or inoperative plow bottom is disposed above the ground-engaging plow bottom, which includes a single gauge wheel for determining the depth of penetration of the plow that is automatically positioned in operative relation to the selected plow bottom as the latter is moved from an inoperative to a ground-engaging position.

Other objects and advantages will be noted in the description of the selected embodiment of the invention, which is illustrated in the accompanying drawings, wherein:

Figure 1 is a perspective view of the two-way plow coupled with a tractor;

Figure 2 is an enlarged perspective view of the plow structure alone, shown in a different operative position from that seen in Figure 1;

Figure 3 is an enlarged fragmentary plan view, in perspective, of the forward portion of the plow structure, with parts broken away and in section;

Figure 4 is an enlarged side view of the plow, in perspective, with parts broken away in order to illustrate certain structural details;

Figure 5 is an enlarged plan view of the forward end of the plow frame, with parts of the structure removed and in section;

Figure 6 is an enlarged side view of the forward end of the plow, with parts broken away and in section;

Figure 7 is a sectional view taken on the line 7—7 in Figure 6;

Figure 8 is an enlarged front view, partly broken away and in section, of a portion of the structure on the forward end of the plow;

Figure 9 is a plan view of the gauge wheel and connecting portions of the plow, partly in section, with the lateral movement afforded for the gauge wheel indicated by broken lines;

Figure 10 is a sectional view taken along the line 10—10 in Figure 9, with parts broken away;

Figure 11 is an enlarged view of one of the elements seen in Figure 10; and

Figure 12 is a side view of the element shown in Figure 11.

With reference to the drawings, particularly Figure 1, it is seen that the apparatus chosen to illustrate the present invention comprises a two-way, two-furrow plow structure 20 which is supported on the rear of a tractor 22 for movement therewith. The plow 20 is coupled to the hitch means 24 on the tractor in a manner affording vertical movement of the plow and hitch means, as a unit, relative to the tractor.

The plow structure 20 comprises generally a forwardly positioned draft frame 26, a plow frame 28 including two pairs of plow bottoms 30 and 32, respectively, and a gauge wheel 34 which is carried by the plow frame and which is selectively positionable to determine the depth of soil penetration for each of the pairs of plow bottoms. In the illustrated form of the invention, the moldboards on the pair of plows 32 are disposed to turn the furrows to the left, as viewed when looking in the direction of travel of the machine, and the plows 30 are designed to turn the furrows to the right. The conversion of the plow structure from operative use of one set of plow bottoms to soil penetration by the other set is attended to by means including a hydraulic ram 36 carried by the plow 20, which is operatively coupled with a source of hydraulic power (not shown) on the tractor. The ram 36 is operable to rotate the rearwardly extending portion of the plow frame relative to the forward portion and thereby move the plow bottoms through an angle of approximately 180 degrees.

Looking also at Figures 2 and 3, it will be noted that the draft frame 26, which is a part of the plow structure 20, comprises a generally U-shaped structure including a pair of rearwardly extending side members 38. The frame members 38 are bent inwardly intermediate their ends and are joined at at their forward ends by a pair of vertically spaced bars 40, as by welding or other suitable means. The rearward portion of the draft frame is additionally braced by a transverse member 42 (Figure 5) which is secured, as by welding, between the rearward ends of the side frame members 38. The bars 40 at the forward end of the draft frame include a pair of vertically aligned openings 43 for receiving a pivot pin 44, which pin also extends through an aligned opening at the forward end of the plow frame 28 to thereby provide lateral swinging movement of the plow frame relative to the draft frame 26. The draft frame also includes a pair of laterally projecting studs 46 which are bolted or otherwise secured to the side frame members in position for connection with the two lower links of the hitch mechanism 24 on the tractor.

The plow frame 28 includes a forward portion 28a, which is pivoted on the pin 44 carried by the draft frame 26, and a rearwardly extending portion 28b which is rotatably mounted on the forward frame portion for movement about a longitudinal axis. More particularly, the forward frame portion 28a includes a wishbone shaped member 48 (Figure 5) which has an opening through its apex for alignment with the openings 43 on the draft frame 26 for connection with the latter through means of the pivot pin 44. The free ends of the member 48 extend rearwardly to a position of sliding engagement with the transverse member 42 at the rear of the draft frame. As seen particularly in Figure 7, a second strap member 50 is bolted to the top of member 42 and includes a pair of elevated intermediate portions which afford limited lateral movement of the member 48 with respect to the draft frame.

A turnover tube structure is disposed in overlying relation to the rearward end of the draft frame 26 and includes a transversely disposed plate structure 52 which is supported on and bolted to the wishbone shaped member 48 by suitable means, such as the elongated angle 54 (Figure 5) and the pair of shorter angle members 56. The plate structure 52 has bolted or otherwise secured thereto a cylindrical bearing or turnover tube 58 which extends rearwardly therefrom along the longitudinal axis of the plow frame. The rear end of this tube is additionally supported by a bracket 60 carried between the ends of a pair of angularly bent members 62 which are connected at their opposite ends with the plate 52.

As seen particularly in Figures 2, 3, and 6, the upper edge of the plate structures 52 includes a support for an upwardly extending hitch post 64. The post 64 mounts a pair of spaced apart plates 66 having aligned openings 68 therein for receiving a connecting pin on the free end of the upper link of the tractor hitch mechanism 24. Additional bracing is provided for the plow frame by a link 70 which is bolted or otherwise secured in position between the plates 66 and a lug provided on the bracket 60 at the rear end of the turnover tube 58.

The rearwardly disposed plow frame portion 28b (Figure 4) comprises a cylindrical mounting 72 disposed between and rigidly secured to a pair of spaced apart frame members 74 and 76 which converge rearwardly of the mounting 72 and provide the main support for the plow beams. The mounting 72 has secured therein a shaft or mast 78 which extends forwardly from the mounting and which is adapted to be received by the turnover tube 58 on the forward frame portion 28a. The outer end of the mast 78 includes a reduced diameter portion 79 and a threaded end 82. As noted for example in Figure 2, when the mast 78 is fitted in the tube 58, and the mounting 72 abuts the rearward end of the tube 58, the reduced and threaded end portions of the mast 78 extend through the plate structure 52. A toothed sprocket 80 is then keyed to the reduced portion 79 of the mast and a nut 83 is placed on the threaded portion 82 to prevent axial separation of the two plow frame portions. The sprocket 80 comprises a portion of the drive means used in turning the mast 78 in a manner to be described hereinafter.

The frame members 74 and 76 (Figure 4) have secured thereto a pair of longitudinally spaced plow beams 84 and 84a for supporting the plow bottoms 30 and a pair of similarly spaced plow beams 86 and 86a, extending in the opposite direction from beams 84 and 84a, for supporting the other pair of plow bottoms 32. The pair of plow bottoms 30 are also laterally spaced apart to provide two-furrow plowing, with the furrows being thrown to the right, and the plow bottoms 32 are similarly arranged to provide two-furrow plowing to the left. It should be understood, however, that the principles of this invention are not restricted to use with a two-furrow plow, but are also applicable to a single furrow as well as a multiple furrow plow of the type illustrated.

Referring particularly to Figures 2, 3, and 8, an explanation will be given with respect to the structure and function of the turnover operating mechanism, which provides for changing from right-hand to left-hand plowing and conversely. As indicated above, the sprocket 80 on the end of the mast 78 provides means whereby the latter may be rotated to thereby shift the plow bottoms through an arc about the axis of the mast. As will be more apparent later on in the description, in the illustrated embodiment it is only necessary and desirable that this rotation be through an arc of approximately 180 degrees.

The means for driving the sprocket 80 is carried by the plate structure 52 and includes generally a drive plate 88, a hydraulic ram 36, and a drive chain 104 extending between the drive plate and the sprocket 80. The drive plate 88 is fixed to a shaft 90 which is journaled in a pair of suitable bearings carried by the plate 52 and a bracket 91 on the frame member 62. The ram 36 includes a cylinder 92 which is pivotally mounted at one end on a lever 94 carried by the forward portion 28a of the plow frame. The piston rod 96 is pivotally connected, by a pin 98, with an arm 100 which is fixed to the shaft 90 mounting the drive plate 88. The drive plate 88 includes a pair of pivotally mounted arms 102 which are adapted to be connected with the opposite ends of the drive chain 104. The chain 104 extends along one edge of the drive plate around the drive sprocket 80 and then back along the other edge of the drive plate. Each end of the drive chain 104 includes a rod 106 extending through an opening in one of the arms 102 on the drive plate, and a coil spring 108 is disposed between a nut 110 on the outer end of each rod and the associated arm 102 on the drive plate. The springs 108 are intended primarily as a cushion or relief means to avoid undue strain on the drive mechanism, in the event that the ram 36 is extended beyond the length of stroke required to produce the desired amount of rotation for the plow frame 28b.

The lever 94, mounting the relatively fixed end of the hydraulic cylinder 92, is fixed to a stub shaft 112 (Figure 8) rotatably journaled in aligned openings through the plate 52 and through a supporting bracket 114 which is attached between the plate structure and the adjoining brace 62. The lever 94 also carries a pin 116 which projects through a slot 118 formed in an arm 120 fixed to the bracket 114. Consequently, as the ram 36 is actuated the initial movement is with respect to the cylinder 92, which moves to the right to cause lever 94 to move about the axis of shaft 112 until the pin 116 engages the opposite end of the slot 118. The purpose of this will be explained hereinafter.

The ram 36 is preferably a double-acting ram with power being supplied to opposite ends of the cylinder, from a source (not shown) on the tractor, through a pair of flexible conduits, such as the hoses 122 and 124.

The means provided for limiting the rotation of the mast 78, and the plow beams carried thereby, includes a pair of stop pads 126 and 126a (Figure 3), which are adjustably mounted on the forward end of the plow frame member 74. These stop pads are positioned for engagement with a pair of rearwardly extending members 128 and 128a (Figure 5), which are fixed to the forward plow frame portion 28a on opposite sides thereof and in the path of travel of the member 74 as the rearward plow frame portion 28b is rotated about the axis of the mast 78. Each of the pads 126 and 126a includes a shank portion threadedly engaging the member 74, so that the length of the arc traversed by the member 74 can be closely adjusted by screwing the stop pads in or out with respect to the threaded opening in the frame member 74.

In addition, there is provided releasable latch means for securing each of the stop pads 126 and 126a in position against the stop members 128 and 128a, respectively, and this latch mechanism includes a pair of arcuate shaped catches 130 and 130a, seen best in Figure 8. Each of the catches is secured at one end to a shaft 132 which is journaled in a bearing bracket 134 fixed, as by bolts, to the stop members 128 and 128a, respectively. Also fixed to the shafts 132 are a pair of arms 136 and 136a which extend upwardly from their respective shafts on the end of the bearing bracket opposite the catch member. The upper ends of the two arms 136 and 136a are provided with alignable openings, and an elongated actuating rod 138 is inserted through each of these openings. The rod 138 preferably includes a turnbuckle 139 at one end for adjustably connecting it with a short rod 142 pivotally mounted on the lower end of an arm 144 fixed to the shaft 112. A nut 146 on the opposite end of the rod 138 holds the rod in place with respect to the catch-operating arms 136 and 136a.

In order to provide yielding movement of the arms 136 and 136a in one direction relative to the rod 138, there is provided a pair of springs 140 and 140a on the rod adjacent each of the catch-operating arms. As seen in Figure 8, the operating arm for the catch 130 has the spring 140 to the left of the arm 136, with the adjacent end of the spring engaging a slidable washer 139 which abuts the end of arm 136. Another pair of washers 142 are fixedly disposed on the rod 138 at the outer end of the spring 140 and against the arm 136, in order to limit the movement of these parts axially of the rod 138. The washer 142 which engages the arm 136 effects a transfer of motion from the rod 138 to the arm 136. An opposite but similar arrangement is provided with respect to the spring 140a, with the latter yielding to movement of the arm 136a in a direction to the right in Figure 8.

As illustrated in Figure 2, the plow 20 is arranged with the plow bottoms 32 in their ground engaging position and disposed to turn the furrows to the left. In this position, the catch 130 (Figure 8) is engaged with the stop pad 126 as the latter rests on the stop 128. From this position the plow bottoms can be readily rotated from the operator's station on the tractor, through the application of pressure fluid in the line 124 (Figure 3) while permitting fluid in the ram 36 to return through the line 122, to thereby effect movement of the ram piston (not shown) to extend the piston rod 96.

However, the movement of the piston rod 96 is initially resisted by the weight of the plow bottoms, whereas the ram cylinder 92 is free to move to the right (Figure 8) the length of the slot 118 in arm 120. Consequently, upon the application of pressure fluid to the ram 36, there is initially effected a movement of the cylinder 92 and, consequently, the supporting arm 94 about the axis of shaft 112, until the pin 116 reaches the opposite end of the slot 118. This movement of arm 94 is accompanied by a swinging of the depending arm 144, in an opposite direction, to produce axial shifting of the catch-operating rod 138. The shifting of rod 138 to the left forces the arm 136 to rotate counter-clockwise on shaft 132, carrying with it the catch 130 which is thereby moved away from engagement with stop pad 126. At the same time, the catch 130a is moved to the left by virtue of the pressure exerted on arm 136a, through the spring 140a, to thereby place the upper end of catch 130a in the path of movement of stop pad 126a.

After the pin 116 strikes the end of slot 118 and the above-described operation of the catches 130 and 130a has been effected, the fluid pressure on the ram piston is effective to extend the piston rod 96 and thereby move the arm 110 and stub shaft 90 about the axis of the latter. This rotation of shaft 90 also rotates the drive plate 88, in a counter-clockwise direction in the described instance (Figure 8), to exert a force on the drive chain 104, through spring 108 and nut 110, to rotate the sprocket 80 and the entire plow frame portion 28b about the axis of the mast 78.

As the plow frame portion 28b is rotated counter-clockwise, as viewed in Figures 2 and 8, the frame member 74 carrying the stop pads 126 and 126a is, of course, also moved in the same direction about the axis of the mast 78. Consequently, as the plow frame portion 28b approaches the end of its arc of movement, the stop pad 126a engages the upper edge portion 130b (Figure 8) of the catch 130a. The edge 130b of the catch serves as a cam surface so that downward movement of the stop pad 126a forces the catch 130a to the right, against the force of the spring 140a on the arm 136a, and the stop pad 126a moves to a position of rest on the upper end of stop 128a. As the enlarged end of the stop pad 126a moves downwardly beyond the cam edge 130b of the catch 130a and presents a portion of reduced size opposite the edge 130b, the latter moves inwardly into engagement with the upper side of the stop pad 126a, under the pressure of spring 140a on arm 136a, as shown in Figure 1.

Once the stop pad 126a is seated on the stop 128a any further extension of the piston rod 96 is absorbed by the relief spring 108a, so that no strain is placed on any portion of the plow or draft structure. This particular arrangement for transmitting power from the hydraulic ram to the plow obviates the need for close attention to the hydraulic system once it has been put in operation to turn over the plow bottoms. Of course, the length of the stroke of the piston rod 96 is approximately just great enough to accomplish the desired degree rotation of the plow, and the usual pressure relief means is preferably included in the hydraulic system to relieve the ram of excessive pressures once the piston has completed its stroke.

It will also be noted that the horizontal leveling or "winging" of the plow bottoms is accomplished by moving the operative stop pad (126 and 126a) in or out with respect to its seat in the frame member 74.

Looking particularly at Figures 2, 4, and 9–12, it is seen that the plow structure 20 includes a single gauge wheel 34, which is operable to adjustably determine the depth of penetration of both pairs of plow bottoms 30 and 32. More particularly, the gauge wheel is secured to a hub 150 which is mounted on a stub axle 152 rotatably carried by a bearing 153 at one end of an arm 154 supported on the plow frame member 76. The arm 154 includes a yoke 156 fixed to its free end and this yoke includes a pair of aligned openings (not shown) affording a pin connection, as by the bolt 158, with a swivel block 160. The block 160 also includes a pivot connection 162, transversely disposed with respect to pin 158, with the plow frame member 76. Thus it is seen that the arm 154 is mounted at its upper end for universal movement with respect to the plow frame. However, there is also provided a tension spring 164, which is interposed between a bracket 166 on the plow frame member 76 and a bracket 168 on the bearing housing 153 for the gauge wheel arm 154, for urging the gauge wheel into a position adjacent the landside of the operating rear plow bottom.

In order to properly position the gauge wheel 34 relative to the rear plow bottoms 30 and 32, there is provided a gauge wheel guide structure 170, which is carried by the rear plow beam structure in position for engagement with an extending portion 168a of the bracket 168 secured to the gauge wheel arm 154. The gauge wheel guide 170 preferably comprises a pair of arcuate, channel-shaped members 172 and 174, which are bolted to a flange 176 joining the ends of the plow frame members 74 and 76 (Figure 4). If desired, these channel-shaped members may abut each other, or they can be made as a single member extending along both plow beams. However, in order to provide a wider range of adjustment for the position of the gauge wheel, it is preferred that they be arranged in the manner illustrated, with a removable spacer flange 178 disposed between the guide members 172 and 174.

As seen particularly in Figures 9–12, the back sides of the channel-shaped guide members 172 and 174 are provided with elongated slots 180 and 182, respectively, to thereby provide for an adjustable positioning of a pair of stop elements 184 and 186 within the channel. Each of the stop elements comprise a plate member 187 which is adapted to fit within one of the channel guide members for adjustable, fixed positioning therein by means of a pair of bolts 188. The bolts 188 are placed through a pair of openings 190 in the plates and through the elongated slot in the guide. Secured to the face of each plate 187, as by welding, is a first stop 192 extending the entire width of the plate and a second spaced-apart stop 194 which extends over approximately one-half the width of the plate 187. The stop elements 184 and 186 are mirror images of each other, in that they differ only in the positioning of the second stop elements 194, as seen in Figure 10. In this way, the stop elements are positionable in spaced relation along the channel guide members so that the full width stops 192 define the upper and lower limits of travel for the bracket extension 168a which is disposed in the channel between the stops 192 (Figure 9). Further, a clear path of travel for the member 168a is afforded along the outer side of the channel between the stops 192, while the second stop elements 194 are disposed along the inner side of the channel guide members. The purpose of this arrangement will be described in connection with the operation of the gauge wheel.

As indicated above, the bracket extension 168a on the gauge wheel arm 154 is disposed within the channel guide members 172 and 174 and, when the plows are in a generally vertical plane, the extension 168a is disposed along the inside of the lowermost guide member and abuts the shorter stop element 194. Consequently, the position of the stop 194 relative to the plow frame determines the position of the gauge wheel and, therefore, the depth of penetration of the operating plow bottoms.

When the rear plow frame portion 28b is rotated in the above described manner, the rotation of the plow bottoms is counter-clockwise, as viewed looking toward the rear of the plow in Figure 2. As the lower plow bottoms 32 move upwardly the gauge wheel 34 moves downward, and the weight of this wheel causes the guide follower 168a to move out of engagement with the stop 194 and against the outside rail of the guide channel 174. Continued movement of the plow is accompanied by a sliding of the follower 168a along the outside rail of the guide 170, until it strikes the full stop 192a at the opposite end of the channel adjacent the rear plow bottom 30. It will be understood, of course, that the spring 164 is designed to permit this movement of the relatively heavy gauge wheel 34, when essentially the entire weight of the wheel is pulling against the spring.

As the plow structure approaches the end of its path of rotation, with plow bottoms 30 on the under side (Figure 1), the gauge wheel 34 again assumes a generally vertical position and, as it does, the spring 164 becomes effective to pull the gauge wheel inwardly and move the follower 168a into the path of the other stop element 194a. When the gauge wheel 34 strikes the ground, the follower 168a firmly abuts the stop 194a to hold the wheel in position relative to the plow frame during operation of the plow bottoms 32. The projection 195 on the outer end of the stop 194a prevents any accidental displacement of the follower 168a.

In changing again to left-hand plowing with plow bottoms 32, the plow frame 28b is rotated clockwise, whereupon the gauge wheel 34 is again directed downward and the follower 168 is again moved to the outside rail of the guide channels and then to the other end of the channel and into a position of engagement with the stop 194 in the manner just described.

It will be apparent from the foregoing that as the stop elements 194 and 194a are positioned farther away from the plow bottoms, the gauge wheel 34 is positioned to permit deeper penetration of the soil by the plow bottoms. Conversely, as the stops 194 and 194a are adjusted to positions nearer the plow bottoms, less penetration of the soil by the plows is permitted. The particular arrangement of two guide channels 172 and 174 with a spacer 178 therebetween provides a wide range of adjustment for the positions of the stop elements and, therefore, a wide range of plowing depths for the plows. Each of the guide channels is adjustably positionable along the supporting bracket 176, and the spacer 178 is removable to provide a wider variety of adjustments and, also, to provide proper ranges of adjustment for different sizes of plow bottoms.

In addition to the previously described features of construction for the two-way two-furrow plow 20, it will be noted in Figure 2 that there is also provision for a rolling colter for each of the plow bottoms. The rear plow bottoms have associated therewith a pair of colters 196 and 198 which are supported in a bracket 200 fixed to the frame member 76 for rotation therewith about the axis of the mast 78. The colters for the forward plow bottoms are preferably mounted in a pair of brackets 202 and 204, which are disposed on opposite sides of the draft frame 26 in position for operative association with the forward plow bottom, as each of the latter are moved into their ground-engaging position.

It will also be noted that the entire plow frame is adapted to be pivoted a limited amount about the pin 44 and relative to the draft frame 26 which remains fixed with respect to the tractor hitch means 24. The amount of movement thus afforded for the plow structure is limited by the engagement of the members 48 with side portions of the draft frame 26, particularly the bolts 206 (Figure 3) for securing the colter brackets 202 and 204 to the frame, which extend inwardly of the frame in position for engagement with the forward portion of the mmebers 48. The amount of free swinging movement thus afforded for the plow structure can, of course, be varied and may be limited only by the amount of travel provided for the ends of members 48 between the transverse draft frame members 42 and 50 (Figure 7).

This limited swinging movement of the plow with respect to its draft frame is particularly important in eliminating much of the side draft effect on the tractor, which is otherwise noticeable when all of the lateral thrust on the plow bottoms is transferred directly to the tractor. By allowing for some lateral swinging of the plow relative to the tractor hitch means, a limited amount of deviation in the direction of the plow bottoms, as well as changes in the side forces on the bottoms, is permitted without a transfer of the resulting side thrust to the tractor. Consequently, it is easier to steer the tractor and maintain a given course of direction, particularly since the operator is not constantly required to hold the tractor on its course in opposition to the numerous small changes in side thrust that commonly occur in plowing.

It is seen, therefore, that the described invention provides a two-way plow of the turnover type, which is adapted to be mounted on the rear of a tractor and which provides a quick and simple change from right-hand plowing to left-hand plowing, or vice versa. Further, there is provided a novel latch means for holding the plow bottoms in position with respect to the draft frame, as well as an easily operable and accurate adjusting means for leveling the plow bottoms. Another very important feature of this invention is the providing of a single gauge wheel, which is automatically positioned in operative relation to the selected plow bottoms, as the latter are moved into their ground-engaging position. This novel arrangement eliminates the weight and expense of a second gauge wheel and permits a complete change from operating one set of plow bottoms to operation of the other set without the operator leaving his seat on the tractor. Then too, a wide range of adjustments is provided by the disclosed structure with respect to the positioning of the gauge wheel relative to the plow bottoms, to thereby increase the effectiveness of the plow and, also, to make it adaptable for use with different size plow bottoms.

Although shown and described with respect to particular apparatus, it will be apparent to those skilled in the art that various modifications might be made without departing from the principles of this invention.

We claim:

1. A two-way plow comprising a draft frame adapted to be fixedly attached to a tractor hitch means for movement therewith, a plow frame pivotally mounted at its forward end portion on said draft frame for limited horizontal swinging movement relative thereto, a plow beam structure extending rearwardly from said plow frame, means connecting said plow beam structure with said plow frame for rotation relative thereto about a longitudinal axis, means on said plow beam structure and on said plow frame cooperable to releasably lock said plow beam structure in a selected one of two positions relative to the frame, a pair of plow bottoms fixed to said plow beam structure in diametrically opposed positions relative to said longitudinal axis, an arm journaled at one end on said plow beam structure for universal movement with respect thereto, biasing means connecting an intermediate portion of said arm with said plow beam structure to urge the arm inwardly towards said plow beam structure, means on the free end of said arm rotatably supporting a gauge wheel for said plow, and means associated with said arm and plow beam structure for limiting the movement of said arm relative to said plow beam structure, said last-mentioned means including a cooperating guide and follower mechanism with the latter disposed to move within said guide, said guide being substantially wider than the follower and including two adjustably positionable stop elements disposed within said guide in the path of said follower, each of said stop elements comprising a first portion extending substantially the width of said guide and a second portion having a lesser width and disposed to permit passage of said follower therepast into engagement with said first portion, said stop elements being arranged in said guide for coaction with said follower in a manner such that rotation of said plow beam structure in a given direction causes said follower to move away from the path of said stop elements due to gravitational forces on said gauge wheel and continued rotation of said plow beam structure causes said biasing means to move said follower back into the path of said stop elements.

2. A two-way plow comprising a draft frame adapted to be fixedly attached to a tractor hitch means for movement therewith and for relative vertical swinging movement, a plow frame structure including a first portion pivotally mounted at its forward end on said draft frame for limited free horizontal swinging movement relative thereto, a second portion of the plow frame structure extending rearwardly from said first portion, means connecting said second portion with said first portion for rotation relative thereto about a longitudinal axis, means carried by said first portion of said plow frame structure and operable to effect said relative rotation of said second portion, means on said first plow frame portion and on said second plow frame portion cooperable to maintain said second portion in a selected one of two positions relative to said first portion, a pair of plow bottoms fixed to said plow frame portion in diametrically opposed positions relative to said longitudinal axis, an arm journaled at one end on said second plow frame portion for universal movement with respect thereto, biasing means connecting an intermediate portion of said arm with said second plow frame portion to urge the arm inwardly towards said second frame portion, means on the free end of said arm rotatably supporting a gauge wheel for said plow, and guide means carried by said second frame portion for defining the path of movement of said arm relative to said second frame portion, said guide means defining a path wider than the engaging portion of said arm, said guide means also including a pair of adjustably positioned stop elements disposed intermediate the ends of said path, each of said stop elements including a first portion extending substantially the width of the path defined by said guide means and defining one end of said path, and each of said stop elements including a second portion disposed inwardly of said first portion in said path and having a width less than the width of said path, whereby said gauge wheel is positionable to determine the depth of penetration of a selected one of said plow bottoms through engagement of said arm with one of said second portions of said stop elements, and whereby rotation of said plow bottoms causes said arm to move out of engagement with the second portion of said one stop element and along to the end of said path as defined by the first portion of said other stop element and into engagement with the second portion of said other stop element to thereby place said gauge wheel in operative position with respect to the other of said plow bottoms.

3. A ground working implement comprising a draft frame adapted to be attached to a tractor, a plow frame supported on said draft frame for relative swinging movement about a generally vertical axis, a pair of plow bottoms mounted on said plow frame in diametrically opposed positions and for rotation relative to said draft frame about a longitudinal axis, means mounted on said plow frame and operable to control the rotation of said plow bottoms, a gauge wheel, an arm pivotally supported adjacent one end on said plow frame and rotatably mounting said gauge wheel on the other end, and means carried by said plow frame in position for engagement with said arm to guide the movement of said arm relative to said plow frame, said guide means including a pair of stop means which are adjustably positionable to selectively determine the extent of swinging movement of said arm about its pivot axis and which are also operable to engage said arm and maintain it in either of two selected operating positions adjacent opposite ends of the path of said arm as defined by said stop means, said guide means, arm and stop elements being arranged to automatically permit said arm to move from a position of engagement with one of said stop elements to a position of engagement with the other of said stop elements upon rotation of the plow bottoms.

4. A ground working implement comprising a draft frame adapted to be attached to a tractor hitch means for movement therewith, a plow frame supported on said draft frame for limited relative swinging movement about a generally vertical axis on the draft frame, a pair of plow bottoms mounted on said plow frame in diametrically opposed positions and for rotation relative to said draft frame about a longitudinal axis, means mounted on said plow frame and operable to control the rotation of said plow bottoms, a gauge wheel, an arm supported adjacent one end of said plow frame for universal movement with respect thereto and rotatably mounting said gauge wheel on the other end of said arm, and guide means carried by said plow frame for defining the path of movement of said arm relative to said plow frame, said guide means comprising an arcuate channel-shaped guide member defining a path wider than the engaging portion of said arm, a pair of stop means which are adjustably positionable along said guide member and which are operative to selectively determine the extent of swinging movement of said arm about its pivot axis and which are also operable to engage said arm and maintain it in either of two selected operating positions, each of said stop means including a first portion extending substantially the width of said channel-shaped guide member and a second portion spaced inwardly from said first portion and having a lesser width to thereby permit passage of said arm therepast, whereby said gauge wheel is positionable to determine the depth of penetration of a selected one of said plow bottoms by said arm engaging one of said stop elements, and whereby rotation of said plow bottoms causes said arm to move out of engagement with said first portion of said one stop element and along said path into engagement with said first portion of the other stop element and thence into engagement with the second portion of said other stop element to thereby place said gauge wheel in operative position with respect to the other of said plow bottoms.

5. In combination with a tractor having a rearwardly mounted vertically, triangularly spaced-apart hitch means adapted for vertical swinging movement relative to the tractor while being substantially fixed against lateral movement, a two-way plow comprising a draft frame having vertically triangularly spaced-apart hitch elements connected with said hitch means for vertical swinging movement therewith, said draft frame including a pair of rearwardly extending, spaced-apart side members and a transverse member fixed to the rear end portions of said side members, a plow frame pivotally mounted on said draft frame adjacent the forward end thereof for horizontal swinging movement relative to said draft frame, said plow frame extending rearwardly from said draft frame and including means thereon cooperating with said transverse member of the draft frame to limit the horizontal swinging movement of the plow frame relative to said draft frame, a plow beam structure extending rearwardly from said plow frame, and power operated means carried by said plow frame and connected with said plow beam structure to rotate the latter about its longitudinal axis.

6. In combination with a tractor having a rearwardly mounted vertically, triangularly spaced-apart hitch means adapted for vertical swinging movement relative to the tractor while being substantially fixed against lateral movement, a two-way plow comprising a draft frame having vertically triangularly spaced-apart hitch elements connected with said hitch means for vertical swinging movement therewith, said draft frame being generally U-shaped and including a pair of rearwardly extending, spaced-apart side members, a transverse member connecting the free end portions of said side members, a strap member fixed to said transverse member and formed to provide with the latter a pair of laterally spaced-apart guideways along the length of said transverse member, a plow frame comprising a wishbone-shaped member pivotally connected at the closed end thereof with a forward, central portion of said U-shaped draft frame, the free ends of said wishbone-shaped member extending rearwardly into the spaced-apart guideways on said transverse member, thereby providing for limited, horizontal swinging movement of the plow frame relative to the draft frame, a plow beam structure extending rearwardly from said plow frame, means connecting said plow beam structure with said plow frame for movement therewith and for rotation relative thereto about a fixed longitudinal axis on said plow frame, and power operated means carried by said plow frame and connected with said plow beam structure to rotate the latter about said longitudinal axis.

References Cited in the file of this patent

UNITED STATES PATENTS

| | | |
|---|---|---|
| 2,616,345 | Silver | Nov. 4, 1952 |
| 2,698,563 | Edwards | Jan. 4, 1955 |
| 2,714,345 | Wilkerson et al. | Aug. 2, 1955 |
| 2,773,439 | Chandler | Dec. 11, 1956 |
| 2,807,200 | Pursche | Sept. 24, 1957 |
| 2,868,307 | Schwegler | Jan. 13, 1959 |

FOREIGN PATENTS

| | | |
|---|---|---|
| 837,329 | Germany | Apr. 21, 1952 |